United States Patent
// Hamidieh et al.

(10) Patent No.: US 6,604,013 B1
(45) Date of Patent: Aug. 5, 2003

(54) TOOL FAILURE DETECTION UTILIZING FREQUENCY DERIVED, PRE-CHARACTERIZATION TEMPLATES

(75) Inventors: Youssef A. Hamidieh, Bloomfield Hills, MI (US); Brij B. Seth, Canton, MI (US); Bhavani Shankar Tata, Canton, MI (US)

(73) Assignee: Ford Motor Company, Dearborn, IL (US)

( * ) Notice: Subject to any disclaimer, the term of this patent is extended or adjusted under 35 U.S.C. 154(b) by 234 days.

(21) Appl. No.: 09/686,612

(22) Filed: Oct. 11, 2000

(51) Int. Cl.[7] .............................................. G06F 19/00
(52) U.S. Cl. ...................................... 700/175; 700/174
(58) Field of Search ................................. 700/174–177, 700/108, 110, 280; 702/34, 35, 56, 82, 84, 141, 182–185; 340/679, 680, 683; 73/577, 579, 598, 659

(56) References Cited

U.S. PATENT DOCUMENTS

| | | | | |
|---|---|---|---|---|
| 4,326,257 A | * | 4/1982 | Sata et al. ................... | 700/175 |
| 4,429,578 A | | 2/1984 | Darrel et al. ................. | 73/659 |
| 4,758,964 A | | 7/1988 | Bittner et al. ................. | 702/34 |
| 4,764,760 A | | 8/1988 | Bedard et al. ............... | 340/680 |
| 4,918,427 A | | 4/1990 | Thomas et al. ............. | 340/680 |
| 5,159,563 A | | 10/1992 | Miller et al. ................... | 702/35 |
| 5,407,265 A | | 4/1995 | Hamidieh et al. .......... | 340/680 |
| 5,579,232 A | | 11/1996 | Tong et al. .................. | 700/175 |
| 5,602,757 A | | 2/1997 | Haseley et al. ............... | 702/56 |
| 5,663,894 A | | 9/1997 | Seth et al. ..................... | 702/56 |
| 6,308,138 B1 | * | 10/2001 | Jones et al. ................. | 700/174 |

* cited by examiner

Primary Examiner—Leo Picard
Assistant Examiner—Ryan Jarrett
(74) Attorney, Agent, or Firm—Raymond L. Coppiellie

(57) ABSTRACT

A system and method to create frequency derived, pre-characterization templates to be used by a machine operator for determining when a tool breaks in one spindle of a multi-spindle machine tool. The pre-characterization template is created by first impacting the tool or the holder and recording the time domain of the frequency pattern of vibrations. The natural frequencies of the tool/tool holder/spindle vibrations which include the vibration frequencies of the tool braking are recorded. Pre-characterization templates are created using FFT techniques to identify only those frequencies indicative of tool breakage. The machine tool operator then uses the monitoring system with pre-characterization templates during machine tool operation and is notified in real time of the breakage of a tool in a single spindle or a multi-spindle machine.

7 Claims, 4 Drawing Sheets

| Template Number: 1 | 64 Number Of Frequencies: | 2 |

| Frequency Number: | 120 1 | 2 | 3 | 4 | 5 |
|---|---|---|---|---|---|
| Frequency Values (Hz): |  | 1200 |  |  |  |
| Frequency Span (Hz): | 1 | 3 | 2 | 3 | 2 |

69

OK  Cancel

Note:
 Number of Frequencies for Template Matching should be between 1 and 5.
 Frequency values should be within the Range of 60 Hz to 8000 Hz.
 Enter Frequencies from Low to High.
 Frequency span is set as follows: (1) - 60 Hz, (2) - 100 Hz, (3) - 140 Hz.

TOOL FAILURE DETECTION UTILIZING FREQUENCY DERIVED, PRE-CHARACTERIZATION TEMPLATES

BACKGROUND OF THE INVENTION

1. Field of the Invention

This invention relates to a system and method for detecting tool failure in general and more particularly to a system using frequency derived pre-characterization templates based on spindle/tooling/gearbox dynamic characteristics.

2. Description of the Related Art

There are a number of tool monitoring systems available utilizing different sensing strategies and algorithms. The benefits of such systems when successful, are improving machine up-time, lowering tooling costs, lowering scrap rates, lowering maintenance and improving quality. However, the performance of these systems has been inconsistent and may work relatively well in one application but is not reliable enough to work in another application. In addition they may require extensive set-up and tuning of the system.

U.S. Pat. No. 5,407,265 issued to Seth et al. on Sep. 2, 1997 and entitled "System and Method for Machining Process Characterization Using Mechanical Signature Analysis" is assigned to a common assignee and is incorporated herein by reference. This patent provides a vibration signature analysis based system and a methodology for machinery characterization that can be used to verify machine build to design intent and can also be utilized for identification of root cause of various anomalies in existing machinery. However, this machine condition detection system/strategy is not suitable for real-time tool monitoring applications.

The article entitled "Monitoring End-mill Wear and Predicting Tool Failure Using Accelerometers" by Roth et al. provides a vibration based tool wear monitoring scheme for end-milling whereby the modal energies of the first and second multiples of the cutter tool pass frequency are utilized for monitoring. This system is limited since in a multi-spindle configuration or with a multi-tool spindle cluster there would be several tools with different configurations. Also, no pre-characterization is performed.

In particular, the performance of these systems is deficient for spindle clusters. The commercially available systems utilize time domain monitoring only for detection of tool failures. U.S. Pat. No. 5,407,265 issued to Hamidieh et al. on Apr. 18, 1995 and entitled "System and Method for Detecting Cutting Tool Failure" is assigned to a common assignee and is incorporated herein by reference. This patent outlines a system that utilizes both time and frequency domain monitoring.

This invention takes the teaching of U.S. Pat. No. 5,407,265 a step further to the difficult applications in machining such as spindle clusters or multi-tool stations. This invention provides additional tool monitoring analytical capability by frequency derived pre-characterization templates resulting in identification of spindle/tooling/gear box natural frequencies and dynamic response characteristics.

Subsequently these frequencies and response characteristics are registered in pre-characterization templates and utilized for reliable monitoring in difficult-to-detect machining applications. If in a particular machining cycle, high vibration levels are encountered, they would be discarded when they may be due to sources such as a vibration being transmitted from a neighboring station or slide motion. The high vibration levels that are registered as tool failure will result with the machine tool being stopped only if the frequencies and response characteristics match those recorded in the pre-characterization templates for tool failures.

SUMMARY OF THE INVENTION

It is therefore a principal advantage of this invention to have a reliable system for determining tool failures in machine tools.

It is yet another advantage to have a system to determine tool failures in multi-spindle machine tools.

It is still another advantage to create frequency derived pre-characterization templates on machine tool monitors, to have a reliable real time indication of a tool failure allowing the machine tool to be stopped and the quality of the work output maintained at high levels.

These and other advantages will be found in the following method and system for creating frequency derived pre-characterization templates for the various tools in each spindle of a multi-spindle machine tool. The method has the steps of first mounting a tool into a tool holder in one of the spindles. A vibration sensor is then located and mounted on the spindle housing to sense vibrations induced from the tool and other sources. The sensor is connected to a computing system having an algorithm for measuring the vibration signals. With the tool not rotating, an impact tool strikes the tool or the tool holder causing it to vibrate to simulate tool failure during machine tool operation. The impacting generates a time domain signature trace. The time domain signature trace is supplied to a fast Fourier transform for generating a frequency spectrum signature trace having an ordinate representing amplitude and an abscissa representing frequency of the vibrations. One or more frequency ranges are located on each frequency signature trace with frequency peaks representing structural natural frequencies associated with modes similar to tool failure excitation in a machining operation.

The frequency ranges that represent tool failure excitation are stored in the computing system memory locations or recorded by the machine tool monitor setup operator. These frequency ranges are used to create operator-readable pre-characterization templates showing the ranges of frequencies and the natural frequency and mode excitation or excitations representing machine tool failure.

These and other advantages are described and claimed in the following specification and drawings.

BRIEF DESCRIPTION OF THE DRAWINGS

In the drawings:

FIG. 7 is a pre-characterization template according to the invention.

DETAILED DESCRIPTION OF THE PREFERRED EMBODIMENT

To better assist in the understanding the following detailed description and drawings is a word list of the elements and reference numbers of the items discussed in the invention.

| Ref. No | Element |
|---------|---------|
| 10 | System for detecting failure of a tool |
| 12 | Machine tool slide |
| 14 | Spindle |
| 16 | Spindle |
| 18 | Tool |
| 20 | Tool |
| 22 | Tool holder |
| 24 | Tool holder |
| 26 | Sensor |
| 28 | Sensor |
| 30 | Work piece |
| 32 | Worktable |
| 34 | Signal conditioner |
| 36 | Signal conditioner |
| 38 | Amplifier |
| 40 | Filter |
| 42 | Processor |
| 44 | Monitor |
| 46 | Time operation graph |
| 48 | Beginning time |
| 50 | Low amplitudes |
| 51 | Contact Time |
| 52 | Computing System |
| 54 | Higher amplitudes |
| 56 | Withdrawn time |
| 60 | Pre-characterization template |
| 62 | Natural frequency |
| 64 | Peak frequency |
| 66 | Striking graph |
| 68 | Hammer |
| 69 | Frequency span |
| 70 | Memory locations |
| 72 | Storing programs |
| 74 | Frequency signature trace |
| 76 | Modal excitations |
| 78 | Vibration plot |
| 80 | Plot |
| 82 | A/D Converter |
| 100 | Start step |
| 102 | Address buffer |
| 104 | Perform FFT |
| 106 | Compute energy bands |
| 108 | Set thresholds |
| 110 | Multiple Thresholds in Frequency Domain |
| 112 | Thresholds not exceeded |
| 114 | End of cycle |
| 115 | Output cycle data |
| 116 | Reinitialize the parameters |
| 118 | Get cycle start |
| 120 | Thresholds exceeded |
| 122 | Comparison |
| 124 | No match |
| 126 | Signal tool failure |
| 128 | Halt operation |
| 130 | Check all templates |
| 132 | No match |

Figure 1:
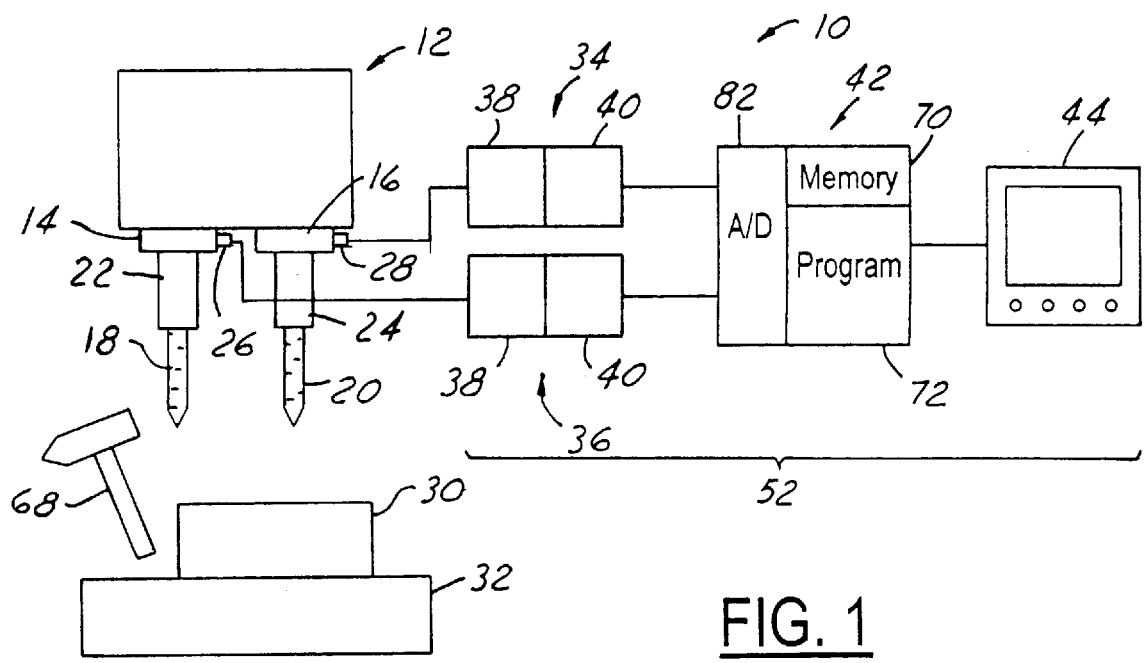
FIG. 1 is a schematic block diagram of pre-characterization system for a tool monitor.

Referring to the Figures by the reference numerals, there is illustrated in FIG. 1 a schematic block diagram of a monitoring system 10 for detecting failure of a tool in a machine. In particular, there is illustrated a machine tool slide 12 having multiple-spindles, in this case two spindles 14, 16, accommodating drill bits or tools 18, 20 that are located in tool holders 22, 24. Operatively connected to each spindle 14, 16 are sensors 26, 28 to sense vibrations in the spindles from the tools 18, 20 and other sources. In particular, each sensor 26, 28 is typically an accelerometer or similar type sensor and it is fixedly mounted to the spindles 14, 16 as close to the tool 18, 20 as is practical.

The spindles 14, 16 are mounted in the machine tool slide 12 that is driven by the machine tool (not shown). Mounted in alignment with the spindles 14, 16, is a work piece 30 mounted on a worktable 32 of the machine tool.

Each sensor 26, 28 is electrically connected in circuit to a computing system 52 having a processor 42 including one or more signal conditioners 34, 36, an amplifier 38, and filter 40 to condition, amplify and filter the signals from the sensors 26, 28. As illustrated, the signal conditioners 34, 36 have amplifiers 38 for the signal input and low pass filters 40 connected thereto in circuit for outputting a useable signal.

The outputs of the signal conditioners are electrically connected in the computing system 52 wherein the signal is initially converted in an A/D converter 82, from an analog signal to a digital signal for processing. Located within the processor 42 are all the necessary elements for processing digital signals to be supplied to a monitor 44 including, memory locations 70 and storing program 72 that will be more fully described below. Such elements are well known in the art.

With this system, the invention to be described is a method and apparatus for developing pre-characterization signatures and modal excitations of a tool failure in a tool/tool holder/spindle combination. In a subsequent tool failure, the failure will be detected during operation of one or more spindles in the machine tool.

Figure 2:
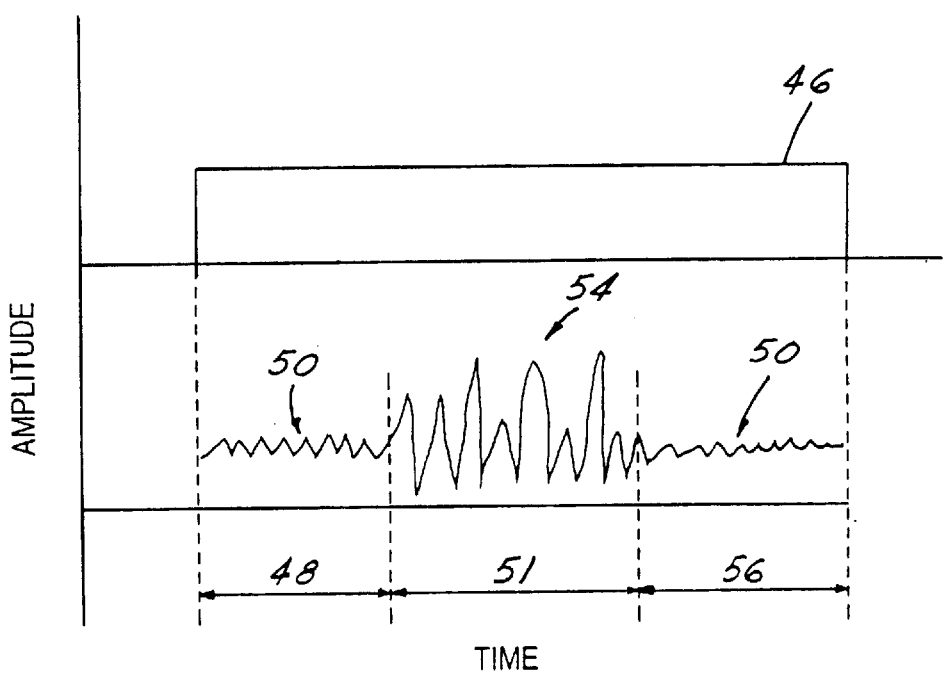
FIG. 2 is a diagram of a vibration signal trace for normal machining operation of a tool.

In a typical operation of the spindle, FIG. 2 illustrates the time domain signature of operation of the tool. The upper graph 46 represents a tool operation cycle. During the beginning operation time 48, the tool is rotating in air, not in any work piece 30 and the amplitudes of vibrations are somewhat lower 50. Next, during the tool operation time 51, when the tool 18 is brought into contact with the work piece 30, the vibration amplitudes 54 are higher. Then, in closing operation time 56, when the tool 18 is withdrawn from the work piece 30 and is back in the air, the amplitudes of vibrations are again somewhat lower 50.

In the present method of pre characterization, there are created one or more frequency templates 60 for subsequent use by a machine tool or monitor in a manner to reliably detect the failure of a tool 18, 20. The pre-characterization template 60 is illustrated in FIG. 7.

The method has an initial step to mount tools 18, 20, into a tool holders 22, 24, (as shown in FIG. 1). Of course in a single spindle housing machine, there will be only one tool holder.

Next at least one vibration sensor 26 is located on the spindle 14, typically there will be only one, but multiple sensors can be used as shown in FIG. 1 for a more detailed sensing of vibrations. The vibration sensor 26 is connected to the computing system 52 that has a plurality of memory locations 70 for storing programs 72, tool machine commands, and inputs from the sensors, etc.

In the initial set-up for a new tool with the spindle stationary and not rotating, a machine tool monitor setup operator uses an impact tool such as a hammer 68 or some similar tool to impact the tool holder 22 causing it to vibrate. This is to simulate a tool failure, which may occur during the machine tool operation.

Figure 3:
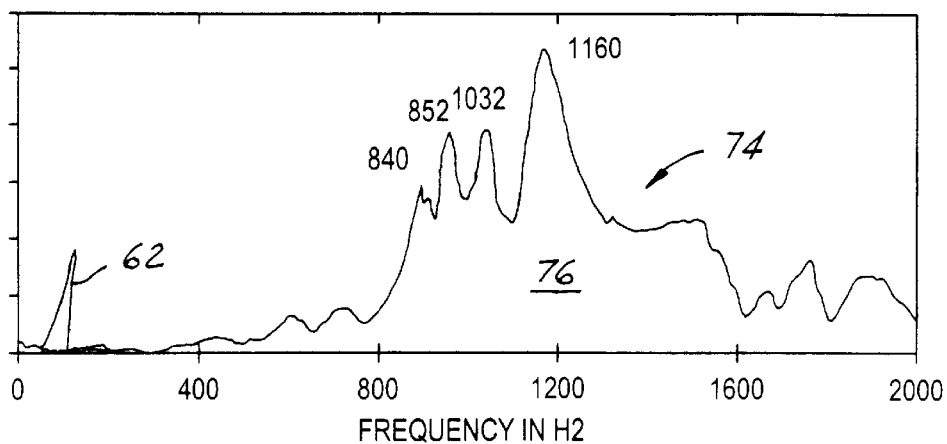
FIG. 3 is a frequency signature trace of a tool during pre-characterization.

If multi-sensors are used, multiple tool strikes are used to calibrate each tool. FIG. 3 illustrates the frequency domain response from the sensor 26 of the tool 18 that has been impacted to simulate a tool failure. In order not to damage the tool, the impacting is generally not done on the tool, but on the tool holder. Care should be taken so the impact does not damage the tool or other item.

The impacting generates a frequency signature trace 74 from the sensor 26 having an ordinate representing amplitude and an abscissa representing frequency, (in Hertz), as shown in FIG. 3. This generating step includes a frequency analyzer located in the processor 42 having a fast Fourier transform algorithm with capability for generating the frequency signature trace 74.

On each frequency signature trace, there are one or more frequency ranges with a frequency peak such as 62 representing a structural natural frequency. The high amplitude or spikes at 840, 852, 1032 and 1160 Hertz, are modal excitations 76, that simulate tool failure excitation due to impacting the tool or the tool holder. The frequencies and the associated frequency spans representing tool failure excitations are stored in the one or more of the computer memory locations. From the data stored in the computer memory locations either a tool monitor setup operator, a computer operator or the computer program will create an operator-readable frequency derived pre-characterization template 60 as shown in FIG. 7. This template 60 shows the peak frequency 64 and associated frequency span 69 over which the local peak is the maximum value. When there are more than one peak in the frequency spectrum, or by the choice of tool monitor set-up operator, several peak frequencies and the associated frequency spans can be recorded in the template 60. Furthermore, more than one template can be generated in a single spindle machine by impacting the same tool holder in the different directions and generating and recording the associated frequency spectrums; and subsequently generating the additional templates. The tool monitoring algorithm will subsequently use these templates to determine a tool failure.

Figure 4:
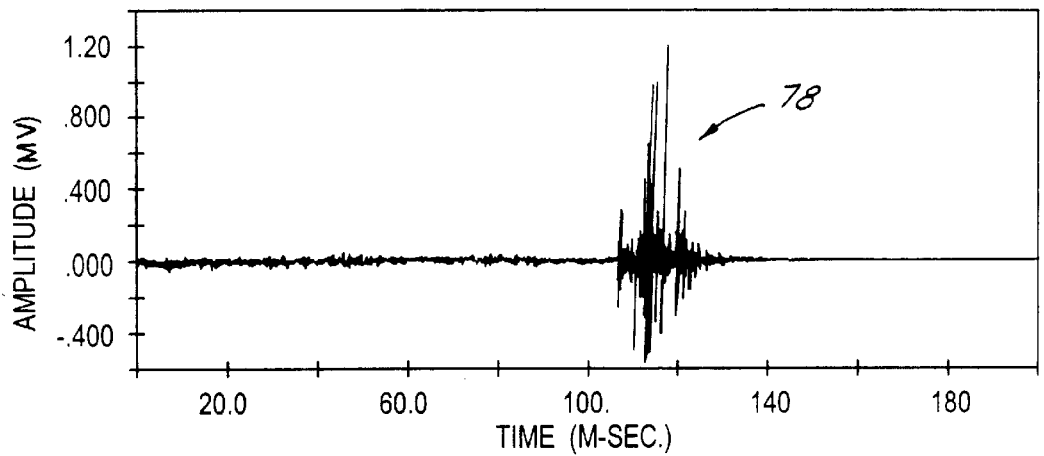
FIG. 4 is a time domain trace for a machining operation where tool breakage is encountered.
Figure 5:
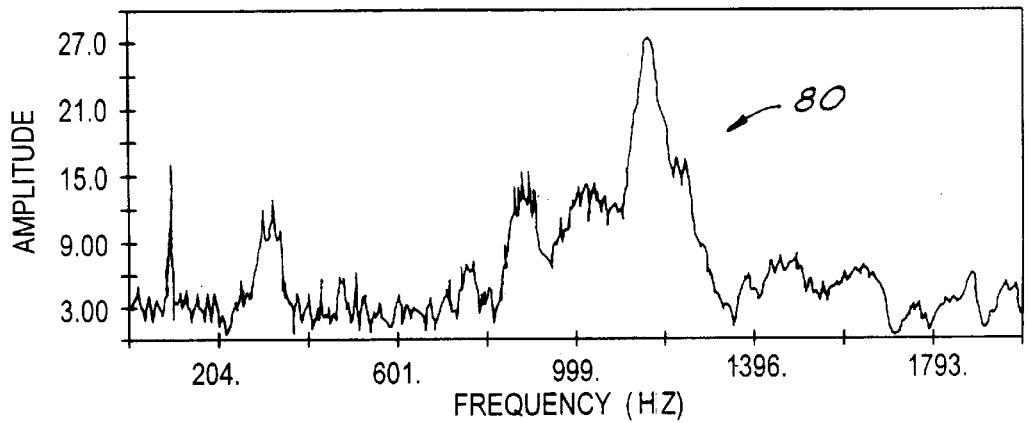
FIG. 5 is frequency domain transform of the breakage signature of FIG. 4.

FIG. 4 represents a time domain signature or vibration plot 78 of a tool during breakage encountered during a machining operation with the sensor located in the same position on the spindle housing as in the pre-characterization phase. FIG. 5 represents a plot 80 as generated by a fast Fourier transform algorithm from the time domain signatures 78 of FIG. 4 during the breakage interval. Comparing, the frequency signature trace 74 in FIG. 3, with the plot 80 in FIG. 5, it is noted that modal excitations at a number of frequency ranges coincide. By the capture of this information in frequency based templates subsequently used in the monitoring algorithm, the reliability of the monitor for the detection of tool breakage is greatly enhanced and stoppage as a result of false triggering by the monitor is greatly reduced.

The method has been described using one spindle but it is capable of additionally repeating the steps of mounting another tool in a tool holder of another one of the spindles. The tool holder 24 is impacted and a frequency signature trace of that sensor 28 on the spindle housing is generated as previously described. This in turn will allow the creation of additional frequency templates 60 with the ranges of frequency or frequencies and peak frequencies of the associated tool excitations for each tool holder and for each sensor in the machine tool.

With the pre-characterization template or templates set up and with the vibration sensors on each spindle housing, the machine tool monitoring system is now ready for monitoring the production operation of the machine tool. The sensors generate electrical signals responsive to tool vibration and other vibrations found in the machine tool and electrically input these signals into the computing system 52.

The computing system 52 including one or more signal conditioners 38, one or more low pass filters 40 and having one or more A/D converters 82, provides conditioning, filtering and digitizing of vibration signals from the sensors. Operatively coupled to the machine tool and responsive to the signals is a computer with memory 72 for storage of the monitoring programs and sensory data. The memory 72 stores both in the time domain and the frequency domain. In addition, the computer 52 has a processor for fast real-time computation of a fast Fourier transform algorithm for producing frequency domain data and other computations of the different elements of the monitoring algorithm. The pre-characterization template 60 or templates that have been generated from the induced vibration of the tool holder by impacting are stored in memory and under control of the monitoring algorithm. For every machining operation for the entire cycle, the signals from the sensors are continuously conditioned 38, filtered 40 and then digitized in the A/D converter 82 and stored in memory locations 70. A buffer of time domain data is transformed to the frequency domain by the fast Fourier transform algorithm. Subsequently, the digitized vibration levels both in the frequency domain and the time domain are checked against respective thresholds in order to detect high vibration levels. If high vibration levels are detected, then the frequencies and ranges are matched against those in the pre-characterization templates. A tool breakage signal to the machine tool controller is generated only if a match is detected in the frequency template. If the high vibration levels are not associated with the tool vibrations, for example transmitted from the neighboring stations, then they are discarded. The processor for the computations is fast enough to allow for continues gap free gathering of digitized vibratory data, frequency domain transform, different processing in the time and the frequency domains and for tool monitoring checking in the different elements of the monitoring algorithm.

Figure 6:
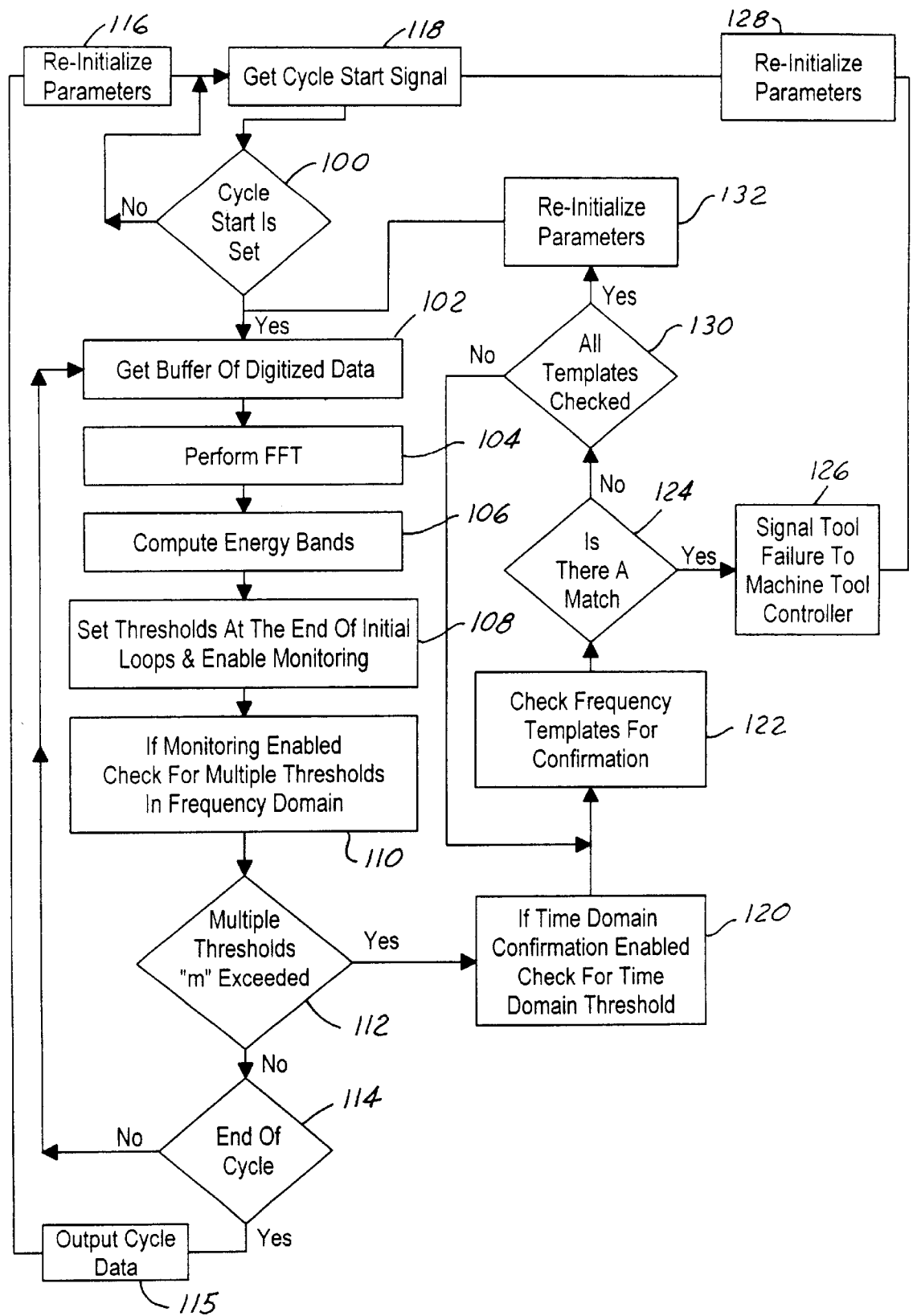
FIG. 6 is a flow chart of the algorithm of the method.

Referring to FIG. 6, there is a flow chart for the monitoring algorithm that utilizes pre-characterization template matching for confirmation of tool breakage detection. The monitoring algorithm further includes an energy band generator to generate energy bands that respond to the frequency signature trace. Various comparators in the monitoring algorithm respond to the frequency and time domain signals and compare them with the multiple thresholds in the frequency domain and a single threshold in the time domain.

Located within the monitoring algorithm is a coordinator. The coordinator locates a match between the peak frequencies in the current signature trace, obtained during the operation of the machine tool, and the failure frequency signals indicated by the pre-characterization template for each spindle.

FIG. 6 is a flow chart of the monitoring algorithm for determining if a tool has failed. The beginning of the flow chart indicates the start 100 of the machining cycle. Then the algorithm addresses 102 the buffer in the processor to get the digitized data for an interval of the operation taking place. The fast Fourier transform algorithm, FFT, processes the digitized data, 104 and the energy bands for different frequencies are computed 106 to indicate the energy levels for the current time domain buffer. The monitoring algorithm then sets thresholds 108 at the initialization phase of the monitoring cycle and before the start of the machining process to avoid the trigging due to vibration levels that are not connected with tool failure. With the monitoring enabled, the frequency domain is checked for multiple thresholds 110. If, in the course of subsequent monitoring portion of the cycle, no thresholds are exceeded 112 and the end of cycle 114 is present, the algorithm outputs the cycle data 115. The cycle then returns to the start of the monitoring cycle to reinitialize the parameters 116 and look for the machine cycle start signal 118 for the start of a new monitoring cycle.

If the frequency domain thresholds are exceeded 112, and furthermore the time domain threshold also is exceeded 120, the resulting peak frequencies and spans are compared 122 against the pre-characterization values for template matching. If there is a match 124, the algorithm signals an alarm for tool failure 126. The alarm may be used to alert the operator or used to direct the machine tool controller to stop the machine. Then, the monitoring program re-initializes the parameters 128 and waits for the next cycle start signal after a tool change by the machine tool operator. If there is no match, the algorithm checks all the pre-characterization templates 130 attached to monitoring algorithm, and if there is still no match 132 the monitoring is resumed.

It should be understood, of course, that while the form of the invention herein shown and described constitutes the preferred embodiment of the invention, it is not intended to illustrate all the possible forms thereof. It will also be understood that the words used are words of description rather than limitation, and that various changes may be made without departing from the spirit and scope of the invention as disclosed.

What is claimed is:

1. A method of pre-characterization a tool failure in a tool/tool holder/spindle combination for subsequent tool failure detection during operation of one or more spindles in a machine tool by creating frequency derived, pre-characterization templates for subsequent use in a machine monitoring system, the method comprising the steps of:

mounting a tool into a tool holder in one or more spindles on the machine tool;

locating at least one vibration sensor near the spindle;

connecting the vibration sensor to a computing system;

impacting the tool or the tool holder causing it to vibrate while the machine tool is not in operation, thereby simulating a tool failure during machine tool operation;

generating a frequency signature trace from the sensor having an ordinate representing amplitude and an abscissa representing frequency;

locating one or more frequency ranges on each frequency signature trace with a frequency peak representing a structural natural frequency and modal excitation representing tool failure excitation;

storing the frequency or the frequencies representing tool failure excitation in computing system memory locations; and then creating a frequency derived, pre-characterization template showing the ranges of frequency and modal excitation or excitations representing machine tool failure.

2. The method of claim 1 wherein the step of generating includes a frequency analyzer having a fast Fourier transform capability for generating the frequency signature trace.

3. The method of claim 1 additionally including the steps of:

mounting another tool in a tool holder of another one of the spindles;

generating another frequency signature trace of that tool; and then creating additional frequency templates with the ranges of frequency or frequencies and mode excitations of the associated tool failure excitations in each tool or the tool holder in the machine tool.

4. A method utilizing a frequency derived, pre-characterization template for detecting a tool failure from one or more spindles on a machine tool comprising the steps of:

securing one or more pre-characterization templates having one or more frequency ranges each representing machine tool failure with said one or more templates being derived from a frequency signature trace generated from an impact applied when the machine tool is not in operation;

placing the templates on a controller coupled to the machine tool;

placing one or more vibration sensors near the spindle for generating electrical signals responsive to tool vibration;

generating a frequency signature trace from said electrical signals;

comparing a template readings with the frequency signature trace generated from the vibration sensor during machine tool operation; and then generating an alarm when high level vibrations are detected and the frequency ranges of the pre-characterization template and the frequency signature trace of the machine tool during machine operation are substantially similar indicating a machine tool failure.

5. A system for generating a frequency derived, pre-characterization template for detecting a tool failure in one or more tool/tool holder/spindles in a machine tool during its cycle of operation, the system comprising:

a tool holder mounted in a spindle of the machine tool for holding a tool;

an impactor for striking the tool for generating a simulated tool failure vibration when the machine tool is not in operation;

at least one vibration sensitive sensor mounted near the spindle and responsive to said simulated tool failure vibration for generating an electrical signal representing sensed vibration;

a computing system operatively coupled to the machine tool and responsive to said electrical signal, said computing system having:

a signal conditioner for conditioning said electrical signal representing the sensed vibration;

a low pass filter operatively coupled to said signal conditioner for filtering the electrical signal;

a digitizer operatively coupled to said filter for continuously digitizing said filtered electrical signal during the operation of machine tool for creating a digitized data signal;

a fast Fourier transform algorithm for continuously transforming said digitized data signal to a frequency domain and generating a frequency signature trace continuously during the operation of the machine tool; and memory locations responsive to said transform algorithm for storing said frequency signature trace; and a frequency template generator responsive to said frequency signature trace for generating an operator-readable pre-characterization template of said tool/tool-holder/spindle failure.

6. A monitoring system utilizing a frequency derived, pre-characterization templates for detecting a tool failure from one or more spindles on a machine tool comprising:

a vibration sensor detecting vibrations from the one or more spindles on the machine tools;

a processor receiving the output of the vibration sensor and creating frequency domain data for comparing with the pre-recorded pre-characterization templates from an induced vibration of the tool on the machine tool when the machine tool is not in operation, the templates having one or more frequency ranges indicating machine tool failure;

a frequency and a time signature trace generator responsive to the output of the vibration sensor for generating frequency and time domain signals representative of the tool;

comparators for comparing the frequency and time domain vibration signatures with the respective frequency and time domain thresholds and templates for indication of tool failure.

7. The system of claim 6 wherein said machine tool monitor system further includes:

an energy band generator for generating energy bands responsive to said frequency signature trace;

at least one threshold detector responsive to said energy band generator for checking the energy band values against the thresholds for detecting high levels of vibration; and a frequency domain detector responsive to said high levels of vibration detected from said frequency signature trace for detecting high levels of vibration.

* * * * *